Jan. 28, 1964   M. C. NELSON   3,119,420
SAW GUIDE ASSEMBLY
Filed Nov. 27, 1961   2 Sheets-Sheet 1

INVENTOR
Mervin C. Nelson

BY Mawhinney & Mawhinney
ATTORNEYS

Jan. 28, 1964 M. C. NELSON 3,119,420
SAW GUIDE ASSEMBLY
Filed Nov. 27, 1961 2 Sheets-Sheet 2
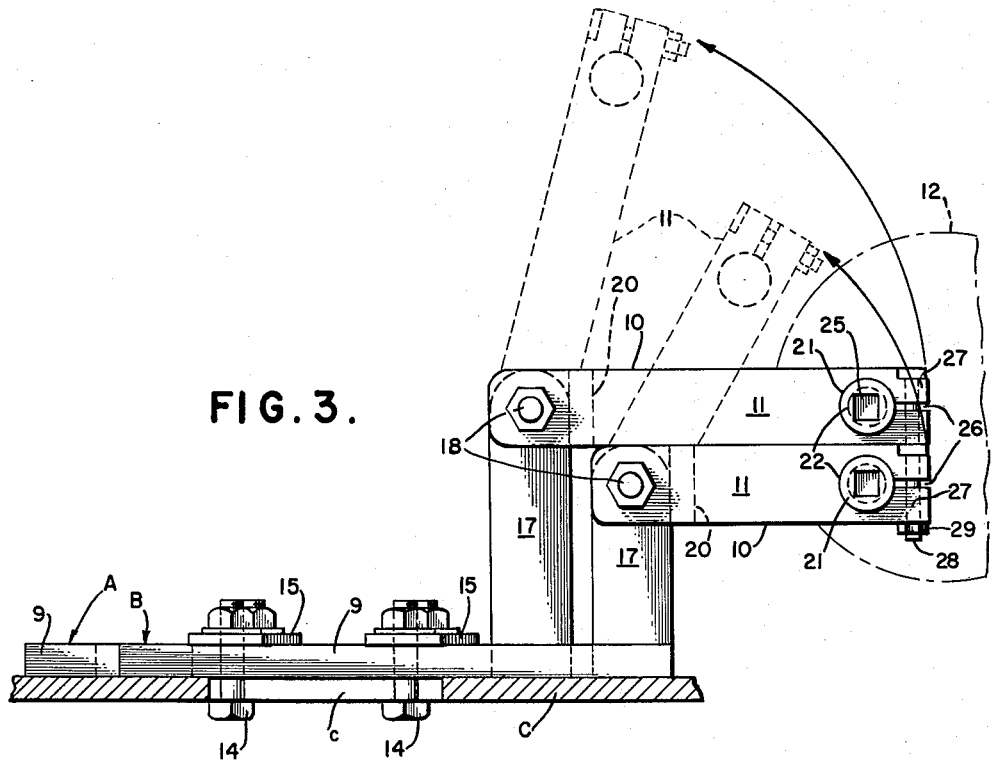
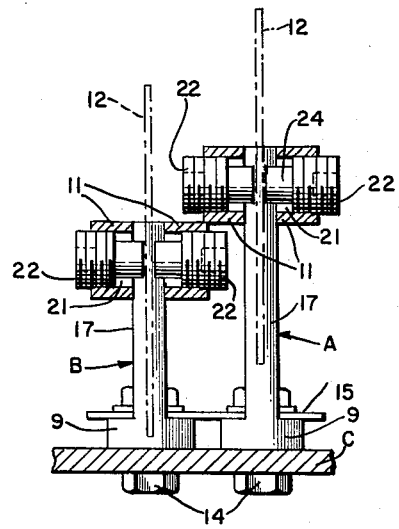
INVENTOR
Mervin C. Nelson
BY
*Mawhinney & Mawhinney*
ATTORNEYS United States Patent Office 3,119,420
Patented Jan. 28, 1964

3,119,420
SAW GUIDE ASSEMBLY
Mervin C. Nelson, Box 742, Clyde Park, Mont.
Filed Nov. 27, 1961, Ser. No. 155,118
10 Claims. (Cl. 143—160)

This invention relates to a Saw Guide Assembly, particularly for the saw blades of a sawing machine such as that known in the art as a "Round-Saw-Gang," that is, the type wherein the machine has provision for adjustment of the saw blades longitudinally of their driving arbor or shaft to different positions relatively to each other.

The prime object of the present invention is to provide an assembly which will enable the cutting of lumber by the machine into minimum widths and which employs saw guiding devices which are individually adjustable relatively to the saw blades and are readily accessible for manipulation by the tools employed.

The second important object is to provide such an assembly comprising a plurality of relatively adjustable saw guiding sets or units in which the saw guiding yokes or forks of the units overlap one above the other so that they may be disposed closer together and the guiding devices made more accessible for adjustment while in the operative position of the yokes.

It is also aimed to so mount the yokes with pivot means which are disaligned to facilitate application and adjustment thereof and which feature enables displacement incidental to replacing or manipulation of the saw blades.

Another important aim is to provide the assembly as a plurality of units or sets laterally adjustable relatively to each other and also adjustable longitudinally individually and relatively to each other.

Further, it is aimed to provide such an assembly in which each unit or set has a base to be clamped in position, and a riser to which the guide yokes are pivoted, the risers of the different yokes differing in height and being offset.

One more object is to provide the arms of the yokes with openings in which the guiding devices are screw-threaded and from which openings the arms are slotted to their distal ends and have coacting bolts or the equivalent which clamp or lock the guiding devices in place.

Still further it is an object to provide an assembly in which the yokes will be disposed in operative position by contact with the aforesaid risers and in which the aforesaid clamping means may also be used to mount the units or sets on the bed or frame of the sawing machine, and generally it is aimed to produce a simple, inexpensive and durable saw guide means or assembly.

Various additional objects and advantages will be pointed out and/or otherwise become apparent from the following description taken in connection with accompanying drawings illustrating an operative embodiment.

In said drawings:

FIGURE 3 is a side elevation of the improvements, fastened in place to a fragment of the bed of the sawing machine, and FIGURE 4 is an end elevation, partly in section, of the parts of FIGURE 3 looking from the right of the latter figure.

Figure 1:
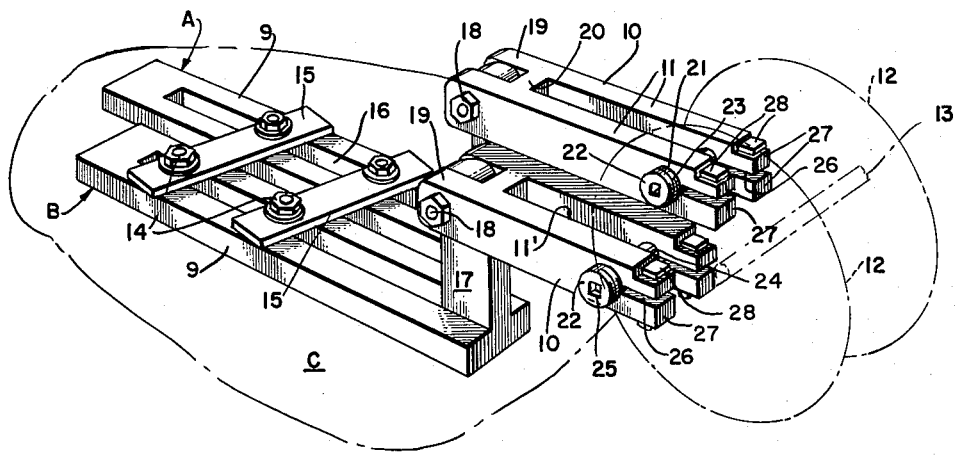
FIGURE 1 is a perspective view of the improved saw guide assembly, being shown in connection with dotted fragments of a sawing machine.
Figure 2:
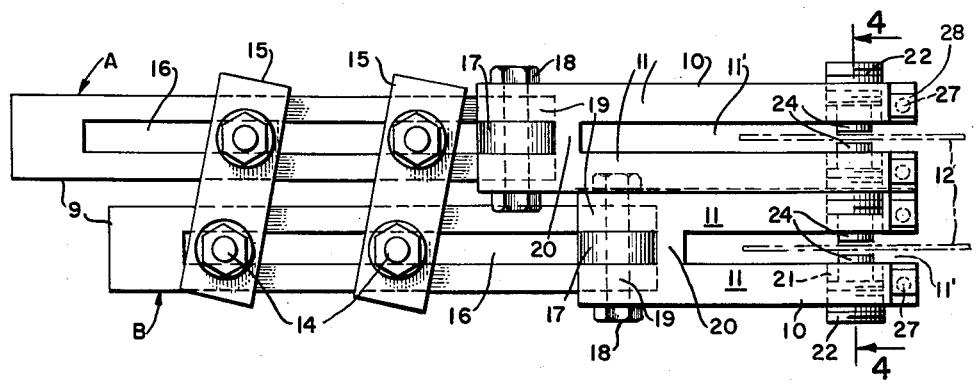
FIGURE 2 is a plan view of the parts of FIGURE 1.

Referring specifically to the drawings, a saw guide assembly is shown consisting of a plurality of sets or units respectively designated A and B. Each set has a saw-guiding yoke or fork designated 10 consisting of spaced arms 11 in the vertical slots 11' between which, saw blades 12 are entered. Said saw blades may for instance be those of the sawing apparatus of the type known in the art as a "Round-Saw-Gang." The saw blades 12 are adjustable with respect to each other to different distances apart longitudinally of their driving arbor or shaft 13.

Each of said units A and B has a base 9 which rests on the bed C or other part of the sawing machine, being slidable thereon longitudinally and laterally to different positions in any of which they are fastened or clamped as by means of bolts 14 passing through the cleats or plates 15 disposed across the tops of bases 9; thence through elongated slots 16 of the bases, and suitably shaped or enlarged slots c (FIGURE 3) of said bed or framework C.

Integral or rigid with each base 9 at one end is a riser 17 to each of which one of the said yokes 10 is fastened by means of a bolt or pivot 18 passing therethrough and also through ears or extensions 19 of said arms 11. A web 20 joins the arms 11 of each pair and in the operative position abuts a face of the adjacent riser 17.

Each arm 11 adjacent its distal end has an opening 21 in which a saw guiding device 22 is screw-threaded at 23. Each guiding device 22 carries integral or separate brass or other guide elements 24, whose inner ends terminate quite close to the saw blades 12, as well shown in FIGURE 4. Said guiding devices 22 are suitably shaped as at 25 to provide recesses, slots or the like for engagement by an appropriately shaped wrench or tool to adjust the guiding devices 22 toward or away from the saw blades.

In addition, from each of the openings 21 the yokes 10 are horizontally slit to their distal ends at 26 and through the resulting tongues or spaced lugs 27 bolts or other locking means 28 are passed, the tightening of the nuts 29 of which bolts clamps and locks the guiding devices in the openings against displacement.

It will be realized that by reason of the bolts 14, plates 15, slots 16 and c, that the units A and B may be moved laterally toward or away from each other, the bolts 14 being loosened and clamped incidental thereto.

The said yokes 10 are at different elevations since the risers 17 are of different heights. Particularly it is to be pointed out that the width of the yokes 10 is greater than the width of the base 9. Accordingly, one yoke 10 is higher than the other yoke 10 and in fact partly overlaps the other yoke 10 and hence the units may be positioned to coact with the saw blades 12 at the minimum distances apart.

The risers 17 are offset since each is at a different distance from the distal end of the base 9 of which it is a part.

It will be clear that the hinge or pivot connections at 18 enables the yokes 10 to be swung or displaced to a position exposing the saw blades 12 as is necessary at times for changing or adjusting the saw blades without removing the yokes. The threaded adjustment of the guiding dives 22 and the locking thereof in adjusted positions by means of the bolts 28 or equivalent, permits the use of saw blades of a much lighter gauge than heretofore, since their firmer and more efficient guiding by the elements 24 prevent dodging, binding and burning of the saws, resulting in greater production. In fact in a sawing machine of the type referred to the jamb nut employed to bind the saws against relative axial displacement may be discarded and the saw blades permitted to float freely on their driving shaft and cut in straight lines without any jamming or burning effect and with the production of less sawdust.

It has long been a desideratum in the present art to devise a means which will cut lumber in minimum widths, and particularly widths of two inches. This result is attained by staggering the yokes 10 of the present invention; the arms 11 of the uppermost yoke 10 actually partly overlapping the innermost arm 11 of the lower yoke 10 as shown.

It is to be understood that an assembly with but two units or sets, such as A and B, have been shown by way of example only and that the principle and theory on which the invention is premised may be carried out where the sawing machine has banks or gangs of more than two blades 12.

Various other changes within the spirit and scope of the invention may be resorted to without departing from the spirit and scope thereof.

What is claimed is:

1. A saw guiding assembly comprising
   (a) saw guide units each for coaction with a different saw blade of a gang operable on substantially the same axis,
   (b) a riser on each unit,
   (c) a saw guide yoke carried by each riser,
   (d) said risers being at different heights, and
   (e) said guide yokes partially overlapping each other whereby said yokes can guide saws spaced closer than the width of a yoke.

2. A saw guide assembly according to claim 1 wherein
   (f) said units are adjustable longitduinally of said axis with respect to each other, and
   (g) means is provided to secure said units rigidly in adjusted positions.

3. A saw guiding assembly according to claim 1 including
   (f) means hinging said yokes to said risers for swinging movements of the yokes in the planes of the respective saws, and
   (g) means carried by said yokes to abut said risers to operatively position the yokes.

4. A saw guiding assembly according to claim 1 wherein
   (f) said yokes have arms,
   (g) said arms having transverse openings, saw guiding devices disposed in said openings,
   (h) said arms having slits extending out from said openings to leave a tongue on each side of said slit, and
   (i) means coacting with said slits and tongues to lock said guiding devices in said openings.

5. A saw guiding assembly according to claim 1 wherein
   (f) said units have bases from which said risers extend,
   (g) said bases having elongated slots, and
   (h) securing means for said bases including
   (i) elements passing adjustably through said elongated slots.

6. A saw guiding assembly according to claim 1 wherein
   (f) the arms of said yokes have transverse openings,
   (g) saw guiding devices disposed in said openings,
   (h) said arms having slits extending out from said openings to leave a tongue on each side of said slits,
   (i) means extending through said tongues across the latter slits clamping said saw guiding devices in place,
   (j) said units having bases from which said risers extend, and
   (k) said bases having elongated slots to accommodate securing elements.

7. A saw guiding assembly comprising approximately parallel saw guide yokes, each of said yokes having a distal end provided with a slot to receive therein a portion of a different saw blade of a gang of parallel saws, said yokes being disposed one above the other and in overlapping relation, said yokes having proximal ends, and disaligned pivot means for said proximal ends, whereby said yokes can guide saws spaced closer than the width of a yoke.

8. A saw guiding assembly comprising approximately parallel saw guide yokes, each for coaction with a different saw blade of a gang of blades disposed on substantially the same axis, said yokes being one above the other and in overlapping relation, and means mounting said yokes for swinging movement relatively to, and in the planes of, said blades, respectively.

9. A saw guiding assembly comprising approximately parallel saw guide yokes which have coaction each with a different saw blade of a gang of blades disposed in parallelism, one yoke being at a different elevation from and overlapping the other, whereby said yokes can guide saws spaced closer than the width of a yoke.

10. A saw guiding assembly as claimed in claim 9 wherein said yokes are pivoted for displacement relatively to but in the planes of the respective saw blades, pivot means for each yoke providing for said displacement, and the axes of said pivot means being disaligned.

References Cited in the file of this patent

UNITED STATES PATENTS

| | | |
|---|---|---|
| 235,824 | Story | Dec. 21, 1880 |
| 304,323 | Hinkley | Sept. 2, 1884 |
| 315,229 | Black | Apr. 7, 1885 |
| 351,672 | Vail | Oct. 26, 1886 |
| 523,298 | Upton | July 17, 1894 |
| 640,902 | Hanson | Jan. 9, 1900 |
| 837,444 | Willett | Dec. 4, 1906 |
| 1,983,421 | Van Wormer | Dec. 4, 1934 |
| 2,110,290 | Criner | Mar. 8, 1938 |